(12) United States Patent
Radhakrishnan (10) Patent No.: US 8,909,769 B2
(45) Date of Patent: Dec. 9, 2014

(54) DETERMINING OPTIMAL COMPONENT LOCATION IN A NETWORKED COMPUTING ENVIRONMENT

(75) Inventor: Rajesh Radhakrishnan, Reston, VA (US)

(73) Assignee: International Business Machines Corporation, Armonk, NY (US)

(*) Notice: Subject to any disclaimer, the term of this patent is extended or adjusted under 35 U.S.C. 154(b) by 155 days.

(21) Appl. No.: 13/408,013

(22) Filed: Feb. 29, 2012

(65) Prior Publication Data

US 2013/0227116 A1    Aug. 29, 2013

(51) Int. Cl.
*G06F 15/173* (2006.01)

(52) U.S. Cl.
USPC .......................................... 709/224; 709/238

(58) Field of Classification Search
CPC .............. H04L 29/08072; H04L 29/06; H04L 29/08081; H04L 43/062; H04L 45/0002; H04L 12/2668; H04L 29/06006
USPC ....................................................... 709/224
See application file for complete search history.

(56) References Cited

U.S. PATENT DOCUMENTS

| | | | | | |
|---|---|---|---|---|---|
| 5,410,586 | A | * | 4/1995 | Davies | 379/14 |
| 5,627,766 | A | * | 5/1997 | Beaven | 702/122 |
| 6,298,044 | B1 | * | 10/2001 | Britt | 370/252 |
| 7,039,577 | B1 | * | 5/2006 | Fingerhut et al. | 703/21 |
| 7,574,496 | B2 | | 8/2009 | McCrory et al. | |
| 8,355,316 | B1 | * | 1/2013 | Lushear et al. | 370/217 |
| 2002/0174246 | A1 | * | 11/2002 | Tanay et al. | 709/238 |
| 2003/0142660 | A1 | * | 7/2003 | Nishimura et al. | 370/351 |
| 2007/0058631 | A1 | * | 3/2007 | Mortier et al. | 370/392 |
| 2008/0222638 | A1 | * | 9/2008 | Beaty et al. | 718/100 |
| 2010/0017465 | A1 | * | 1/2010 | Brownrigg et al. | 709/203 |
| 2010/0202287 | A1 | * | 8/2010 | Diaz et al. | 370/230 |
| 2011/0023048 | A1 | * | 1/2011 | Srinivasan | 718/105 |
| 2011/0131335 | A1 | | 6/2011 | Spaltro et al. | |
| 2011/0276685 | A1 | * | 11/2011 | De Waal et al. | 709/224 |
| 2011/0282975 | A1 | | 11/2011 | Carter | |
| 2013/0111049 | A1 | * | 5/2013 | Abu-Amara et al. | 709/230 |

OTHER PUBLICATIONS

Maitland, J., "Keeping Control Isn't Easy", Chapter 4: Cloud-Based Infrastructure, SearchCloudComputing.com, 13 pages, Oct. 12, 2009.
Mell et al., "The NIST Definition of Cloud Computing", National Institute of Standards and Technology, Information Technology Laboratory, Version 15, Oct. 7, 2009, 2 pages.
Liu, L. et al., "GreenCloud: A New Architecture for Green Data Center", ICAC-INDUST '09, Jun. 16, 2009, Barcelona, Spain. 10 pages. www.cse.unl.edu.
Edmondson, J. et al., Multi-Agent Distributed Adaptive Resource Allocation (MADARA), Vanderbilt University, 2010, 9 pages.
Malet, B. et al., "Resource Allocation across Multiple Cloud Data Centres", Imperial College, London, Nov. 29, 2010, 5 pages.

* cited by examiner

*Primary Examiner* — Jonathan C Teixeira Moffat
*Assistant Examiner* — Eyob Hagos
(74) *Attorney, Agent, or Firm* — William E. Schiesser; Keohane & D'Alessandro, PLLC (57) ABSTRACT

Service data and service management data traffic in a networked computing environment (e.g., a cloud computing environment) may flow thorough a large number of devices (e.g., storage, network, cache and other devices and appliances) when the data move from one or more source systems to one or more target systems (or end user systems). Embodiments of the present invention provide a data analysis driven approach that detects patterns in data movements, and data traffic can be used to determine placement of certain network service components such as, among others, storage devices and appliances, server devices and appliances, network devices and appliances, etc.

19 Claims, 6 Drawing Sheets

DETERMINING OPTIMAL COMPONENT LOCATION IN A NETWORKED COMPUTING ENVIRONMENT

TECHNICAL FIELD

The present invention relates generally to network component placement/location. Specifically, the present invention relates to the determination of optimal placement of components in a networked computing environment (e.g., a cloud computing environment).

BACKGROUND

The networked computing environment (e.g., cloud computing environment) is an enhancement to the predecessor grid environment, whereby multiple grids and other computation resources may be further enhanced by one or more additional abstraction layers (e.g., a cloud layer), thus making disparate devices appear to an end-consumer as a single pool of seamless resources. These resources may include such things as physical or logical computing engines, servers and devices, device memory, and storage devices, among others.

Certain complexities may be associated with public and private cloud environments such as: multiple cloud services in a cloud environment, multiple tenants in a cloud environment, multiple data centers, disparate global locations of cloud data centers and end users, sharing of infrastructure elements by multiple cloud services and cloud tenants, etc. Given such potential complexities, challenges may exist in determining optimal network topologies so that network data traffic throughput can be streamlined.

SUMMARY

Service data and service management data traffic in a networked computing environment (e.g., a cloud computing environment) may flow thorough a large number of devices (e.g., storage devices, network devices, cache devices, and other devices/appliances) when the data moves from one or more source systems to one or more target systems (or end user systems). Embodiments of the present invention provide a data analysis driven approach that detects patterns in data movements and data traffic. The detected patterns can be used to determine placement of certain network service components (e.g., storage devices and appliances, server devices and appliances, network devices and appliances, etc.). In a typical embodiment, network traffic meta-data for each of a set of components (e.g., identifying a number of hops a set of data makes as the set of data is communicated between the set of components) in the networked computing environment is collected in a computer storage device or the like. A current network topology of the set of components is then determined based on the network traffic meta-data. The network traffic meta-data is then analyzed to determine an optimized network topology for the set of components, which may then be implemented.

A first aspect of the present invention provides a computer-implemented method for determining optimal component location in a networked computing environment, comprising: collecting, in a computer storage device, network traffic meta-data for each of a set of components in the networked computing environment, the network traffic meta-data identifying a number of hops a set of data makes as the set of data is communicated between the set of components; determining a current network topology of the set of components based on the network traffic meta-data; analyzing the network traffic meta-data to determine an optimized network topology for the set of components, the optimized network topology minimizing the number of hops the set of data makes as the set of data is communicated between the set of components; and implementing the optimized network topology.

A second aspect of the present invention provides a system for determining optimal component location in a networked computing environment, comprising: a memory medium comprising instructions; a bus coupled to the memory medium; and a processor coupled to the bus that when executing the instructions causes the system to: collect, in a computer storage device, network traffic meta-data for each of a set of components in the networked computing environment, the network traffic meta-data identifying a number of hops a set of data makes as the set of data is communicated between the set of components; determine a current network topology of the set of components based on the network traffic meta-data; analyze the network traffic meta-data to determine an optimized network topology for the set of components, the optimized network topology minimizing the number of hops the set of data makes as the set of data is communicated between the set of components; and implement the optimized network topology.

A third aspect of the present invention provides a computer program product for determining optimal component location in a networked computing environment, the system comprising a computer readable storage media, and program instructions stored on the computer readable storage media, to: collect, in a computer storage device, network traffic meta-data for each of a set of components in the networked computing environment, the network traffic meta-data identifying a number of hops a set of data makes as the set of data is communicated between the set of components; determine a current network topology of the set of components based on the network traffic meta-data; analyze the network traffic meta-data to determine an optimized network topology for the set of components, the optimized network topology minimizing the number of hops the set of data makes as the set of data is communicated between the set of components; and implement the optimized network topology.

A fourth aspect of the present invention provides a method for deploying a system for determining optimal component location in a networked computing environment, comprising: providing a computer infrastructure being operable to: collect, in a computer storage device, network traffic meta-data for each of a set of components in the networked computing environment, the network traffic meta-data identifying a number of hops a set of data makes as the set of data is communicated between the set of components; determine a current network topology of the set of components based on the network traffic meta-data; analyze the network traffic meta-data to determine an optimized network topology for the set of components, the optimized network topology minimizing the number of hops the set of data makes as the set of data is communicated between the set of components; and implement the optimized network topology.

BRIEF DESCRIPTION OF THE DRAWINGS

These and other features of this invention will be more readily understood from the following detailed description of the various aspects of the invention taken in conjunction with the accompanying drawings in which.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION

Illustrative embodiments will now be described more fully herein with reference to the accompanying drawings, in which embodiments are shown. This disclosure may, however, be embodied in many different forms and should not be construed as limited to the embodiments set forth herein. Rather, these embodiments are provided so that this disclosure will be thorough and complete and will fully convey the scope of this disclosure to those skilled in the art. In the description, details of well-known features and techniques may be omitted to avoid unnecessarily obscuring the presented embodiments.

The terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. The term "set" is intended to mean a quantity of at least one. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof.

As indicated above, Service data and service management data traffic in a networked computing environment (e.g., a cloud computing environment) may flow thorough a large number of devices (e.g., storage devices, network devices, cache devices, and other devices/appliances) when the data moves from one or more source systems to one or more target systems (or end user systems). Embodiments of the present invention provide a data analysis driven approach that detects patterns in data movements and data traffic. The detected patterns can be used to determine placement of certain network service components (e.g., storage devices and appliances, server devices and appliances, network devices and appliances, etc.). In a typical embodiment, network traffic meta-data for each of a set of components (e.g., identifying a number of hops a set of data makes as the set of data is communicated between the set of components) in the networked computing environment is collected in a computer storage device or the like. A current network topology of the set of components is then determined based on the network traffic meta-data. The network traffic meta-data is then analyzed to determine an optimized network topology for the set of components, which may then implemented.

It is understood in advance that although this disclosure includes a detailed description of cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed, automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active consumer accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited consumer-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application-hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 1:
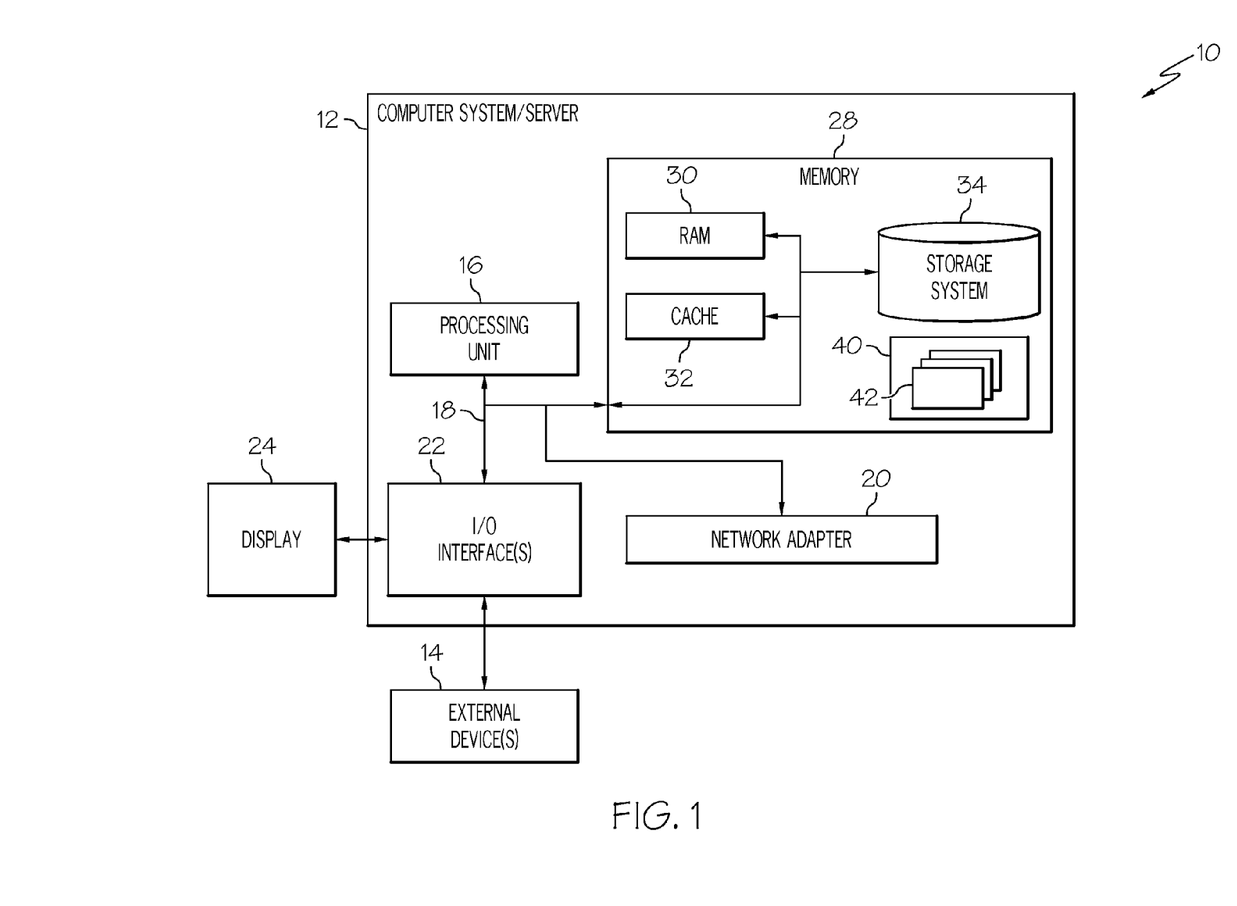
FIG. 1 depicts a cloud computing node according to an embodiment of the present invention.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10, there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM, or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

The embodiments of the invention may be implemented as a computer readable signal medium, which may include a propagated data signal with computer readable program code embodied therein (e.g., in baseband or as part of a carrier wave). Such a propagated signal may take any of a variety of forms including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium including, but not limited to, wireless, wireline, optical fiber cable, radio-frequency (RF), etc., or any suitable combination of the foregoing.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a consumer to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
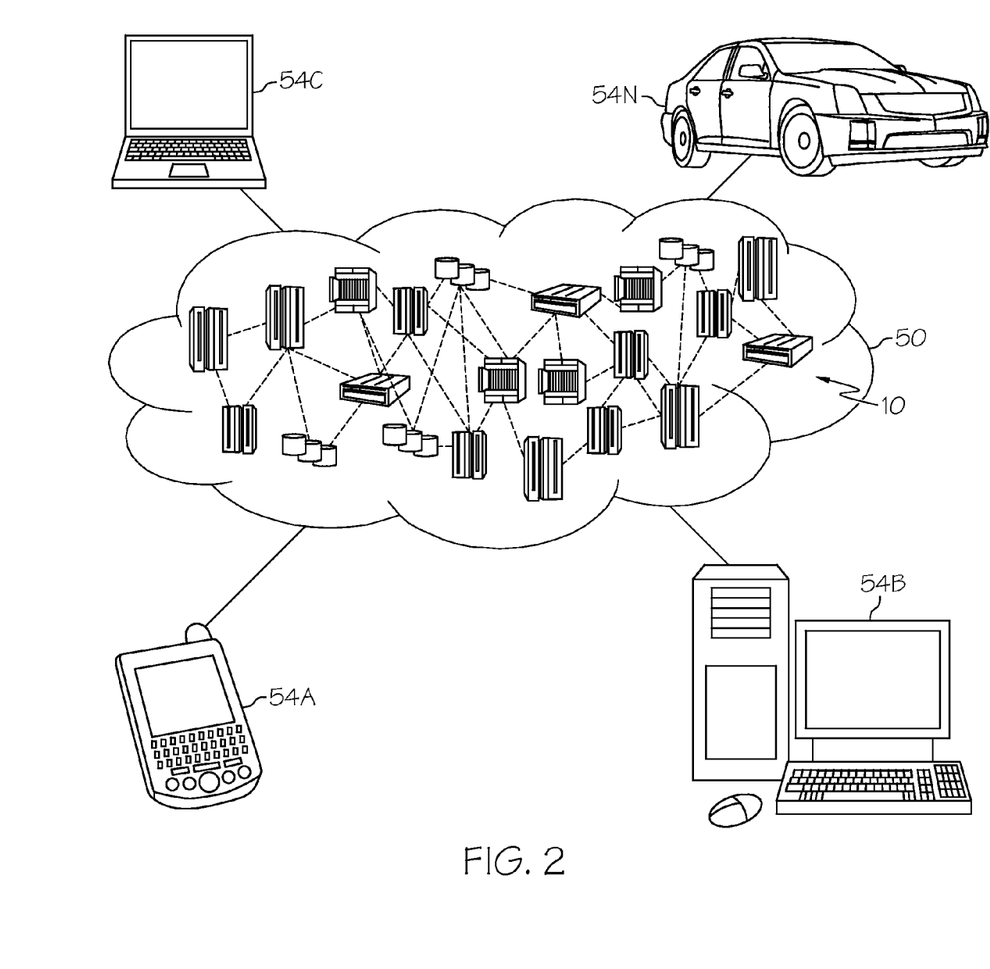
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as private, community, public, or hybrid clouds as described hereinabove, or a combination thereof. This allows cloud computing environment 50 to offer infrastructure, platforms, and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
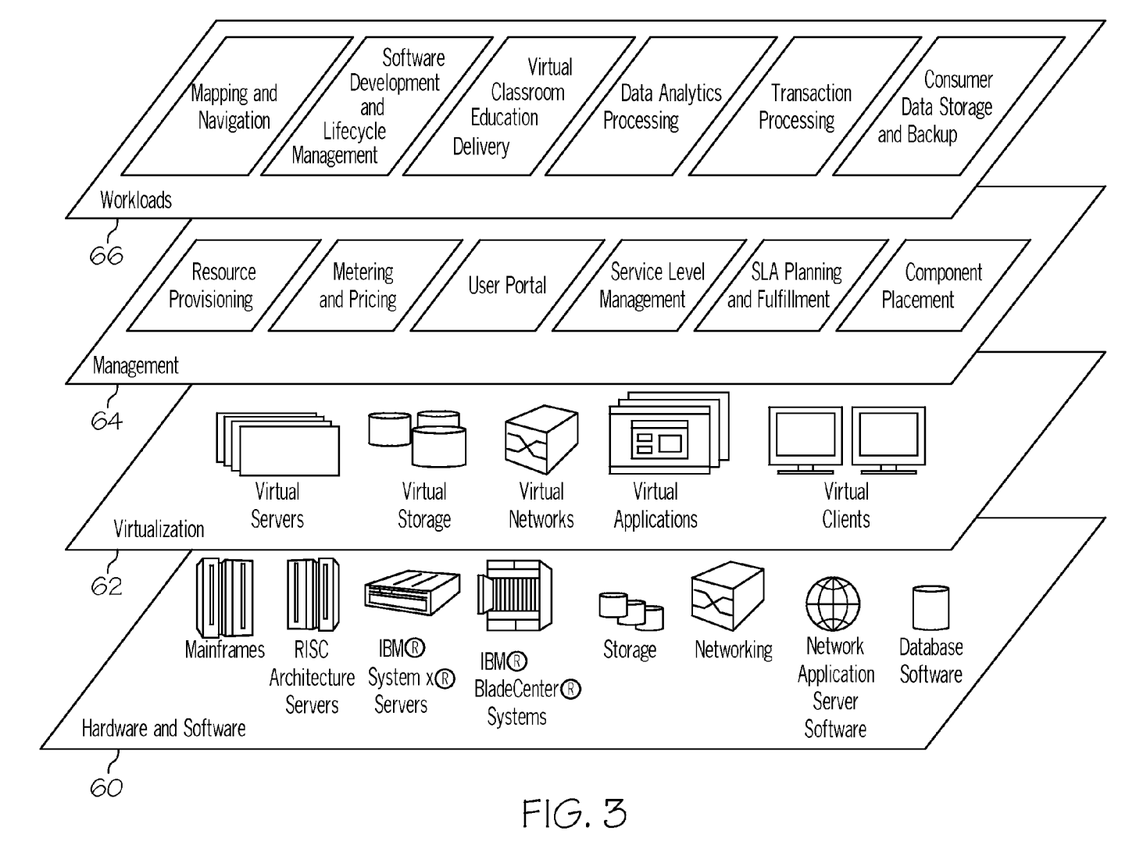
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes. In one example, IBM® zSeries® systems and RISC (Reduced Instruction Set Computer) architecture based servers. In one example, IBM pSeries® systems, IBM System x® servers, IBM BladeCenter® systems, storage devices, networks, and networking components. Examples of software components include network application server software. In one example, IBM WebSphere® application server software and database software. In one example, IBM DB2® database software. (IBM, zSeries, pSeries, System x, BladeCenter, WebSphere, and DB2 are trademarks of International Business Machines Corporation registered in many jurisdictions worldwide.)

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. Consumer portal provides access to the cloud computing environment for consumers and system administrators. Service level management provides cloud computing resource allocation and management such that required service levels are met. Service Level Agreement (SLA) protocolning and fulfillment provides pre-arrangement for, and procurement of, cloud computing resources for which a future requirement is anticipated in accordance with an SLA. Further shown in management layer is component placement, which represents the functionality that is provided under the embodiments of the present invention.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and consumer data storage and backup. As mentioned above, all of the foregoing examples described with respect to FIG. 3 are illustrative only, and the invention is not limited to these examples.

It is understood that all functions of the present invention as described herein typically may be performed by the component placement functionality of management layer 64, which can be tangibly embodied as modules of program code 42 of program/utility 40 (FIG. 1). However, this need not be the case. Rather, the functionality recited herein could be carried out/implemented and/or enabled by any of the layers 60-66 shown in FIG. 3.

It is reiterated that although this disclosure includes a detailed description on cloud computing, implementation of the teachings recited herein are not limited to a cloud computing environment. Rather, the embodiments of the present invention are intended to be implemented with any type of networked computing environment now known or later developed.

As indicated above, embodiments of the present invention provide (among other things) a data analysis driven approach that detects patterns in data movements and data traffic can be used to determine placement of certain cloud service components including storage devices and appliances, server devices and appliances, network devices and appliances, among others. Along these lines, each node or component or building block in the distributed or cloud computing environment may have a unique identifier (ID) (e.g., configuration ID in a Configuration Management Information Systems (CMIS)). These components can either be physical (hardware) or virtual devices or appliances. Moreover, each and every node or component is typically assigned a unique role such as Internet Protocol (IP) load balancer, Secure Sockets Layer (SSL) accelerator, Network Attached Storage (NAS) file server, etc. Each component or building block (BB) that is or can be either the source or conduit of data may log/record traffic meta-data such as:

the number of other devices that the node sends traffic to, by:
   number of first hop nodes (e.g., for a direct connection);
   number of second hop nodes (e.g., for an indirect connection via a first hop node);
   number of third hop nodes;
   etc.
the magnitude of data traffic between self and other nodes; and/or the latency (response time) between self and other nodes. It can be assumed that in general, the more the hops the higher the latency and the more the distance the higher the latency).

any propagation delay.

any processing and serialization delay.

any queuing delay.

The embodiments of the present invention may collect this traffic meta-data from each node in the environment and analyze the same (e.g., for both historical and current traffic meta-data) to develop a current cloud/network topology and a target cloud/network topology by recommending/making determinations about optimal placement of new devices, as well as re-placement of current devices in the given network topology. These embodiments may be applied to all devices that have IP addresses. Moreover, under the embodiments of the present invention, a method for verification and validation of service traffic meta-data may be provided. For example: if node A logs that it is connected to node E directly (one hop) and the traffic between node A and node E is about 30 MB per day on an average, node E should also log substantially identical meta-data (i.e., it is directly connected to node A and handles about 30 MB of traffic per day).

Figure 4:
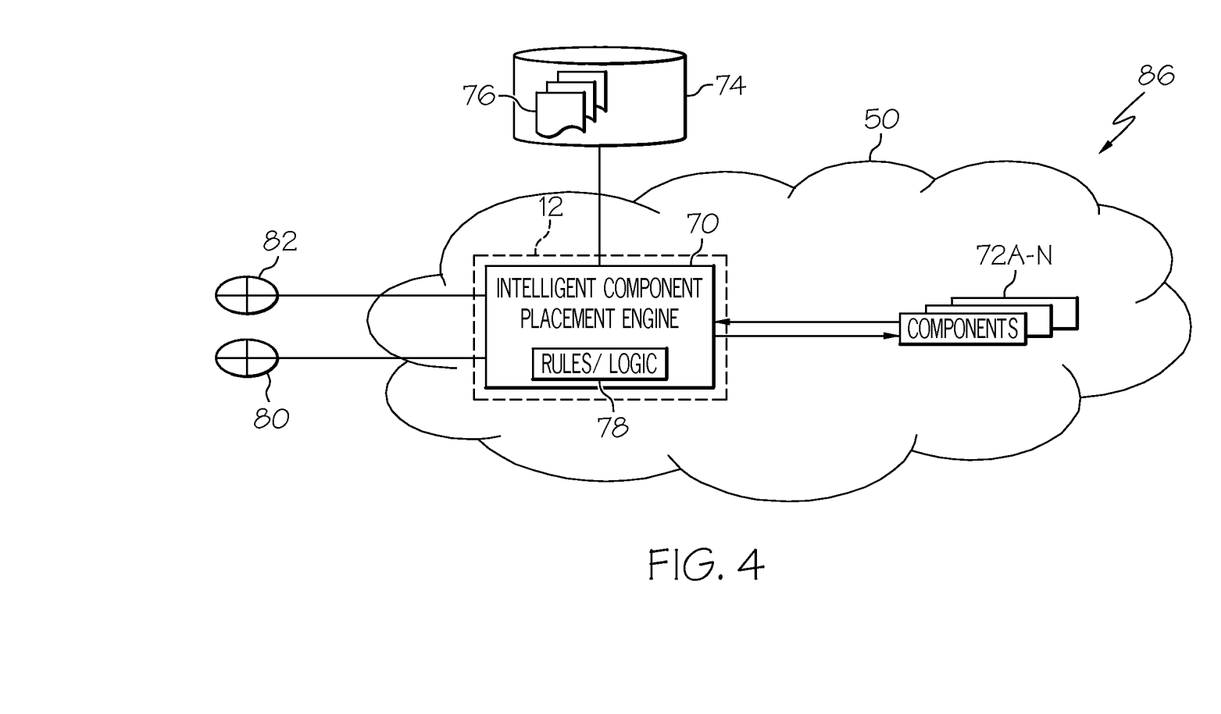
FIG. 4 depicts a system diagram according to an embodiment of the present invention.

Referring now to FIG. 4, a system diagram describing the functionality discussed herein according to an embodiment of the present invention is shown. It is understood that the teachings recited herein may be practiced within any type of networked computing environment 86 (e.g., a cloud computing environment 50). A stand-alone computer system/server 12 is shown in FIG. 4 for illustrative purposes only. In the event the teachings recited herein are practiced in a networked computing environment 86, each client need not have an intelligent component placement engine (engine 70). Rather, engine 70 could be loaded on a server or server-capable device that communicates (e.g., wirelessly) with the clients to provide component placement therefor. Regardless, as depicted, engine 70 is shown within computer system/server 12. In general, engine 70 can be implemented as program/utility 40 on computer system 12 of FIG. 1 and can enable the functions recited herein. As further shown, engine 70 (in one embodiment) comprises a rules and/or computational engine that processes a set (at least one) of rules 78 and/or provides intelligent component placement hereunder.

Along these lines, engine 70 may perform multiple functions similar to a general-purpose computer. Specifically, among other functions, engine 70 may (among other things): collect (e.g., in a computer storage device 74) network traffic meta-data 76 for each of a set of components 72A-N (e.g., physical hardware and/or virtual devices) in the networked computing environment 86. In a typical embodiment, the network traffic meta-data identifies/comprises: a number of hops a set of data makes as the set of data is communicated between the set of components 72A-N, a magnitude of data traffic between the set of components, latency of communication as the set of data is communicated between the set of components under the existing network topology, a propagation delay, processing and serialization delay, and/or queuing delay. In any event, engine 70 may further: determine a current network topology 80 of the set of components 72A-N based on the network traffic meta-data 76; analyze the network traffic meta-data 76 to determine an optimized network topology 82 for the set of components 72A-N (e.g., that minimizes the number of hops the set of data makes as the set of data is communicated between the set of components 72A-N); the optimized network topology implement the optimized network topology 72A-N (e.g., relocate at least one of the set of components 72A-N to achieve the minimized number of hops).

ILLUSTRATIVE EXAMPLES

Shown below are illustrative examples according to at least one embodiment of the present invention.

Example Scenario 1

Network-Attached Storage (NAS) Appliance and NAS Clients

A US based Cloud Service Provider (CSP) of file storage services provides cloud based mechanisms to store and retrieve all kinds of files for small and medium businesses (SMB). The cloud service provider has a few dozen clients (SMBs) and a few hundred groups of NAS appliances tuned and dedicated for specific classes of files such as word processing files, PDF files, spreadsheets, image files, etc. The NAS appliances themselves are located in geographically dispersed cloud data centers across North America. The clients access the cloud environment via customized (business specific) access portals to upload, organize, and download relevant files. There are several cache appliances as part of the edge cloud environment that provide faster access to frequently and recently accessed files (edge cloud environment refers to a network of edge systems that provide the full set of services or partial set of services, currently provided by data center clouds). A NAS appliance may have first and second hop nodes as network gear (e.g., switches, routers and load balancers) and cache appliances as third hop nodes (e.g., there may be several cache appliances as third hop nodes). Detecting the traffic pattern between these NAS appliances (e.g., as part of the core cloud) and the cache appliances (e.g., as part of the edge cloud) can help provide optimal placement of NAS appliances relative to cache appliances. For example, NAS appliance N-XYZ1 may store files for A, B, and C clients, while cache appliance C-XYZ6 may be caching files associated with clients A, C, and D, and while cache appliance C-XYZ7 may be caching files associated with clients B, E, and F (e.g., due to their proximity to the client locations (client access network). So, based on analytics, it may be determined that NAS appliance N-XYZ1 could be moved to the data center and machine room where cache machine CXYZ6 is located and may even eliminate one or more hops between the two appliances.

Example Scenario 2

Cache Appliance and End User Locations

An edge cloud has hundreds of cache appliances located at a number of data centers in different locations. These cache appliances may also be specialized for a given application or file type. Even some general principles may be to cache data frequently, cache recently used data (files, images, etc.), and/or use cache appliances located closer to the end user groups (using those files and data), caching algorithms have other considerations while determining which files to cache and which cache appliances to cache to (from the available pool of geographically distributed cache appliances). Therefore, engine 70 may use data (meta-data) about traffic patterns between the pool of cache appliances and the number of client networks to make intelligent determinations about locating and placing cache appliances.

Example Scenario 3

Web Servers and Application Servers

A set of web servers (presentation logic) and application servers (business logic) are found to be in different physical networks even though they are frequently communicating with each other. Both sets of servers are contained on sets of virtual machines, but were originally placed on different physical networks due to capacity constraints. Engine 70 detected the traffic flow and capacity configurations and pools and recommends moving (locating) both servers and their respective virtual machines (VMs) on to the same physical server or same pool of physical servers (located within the same sub-net).

Figure 5:
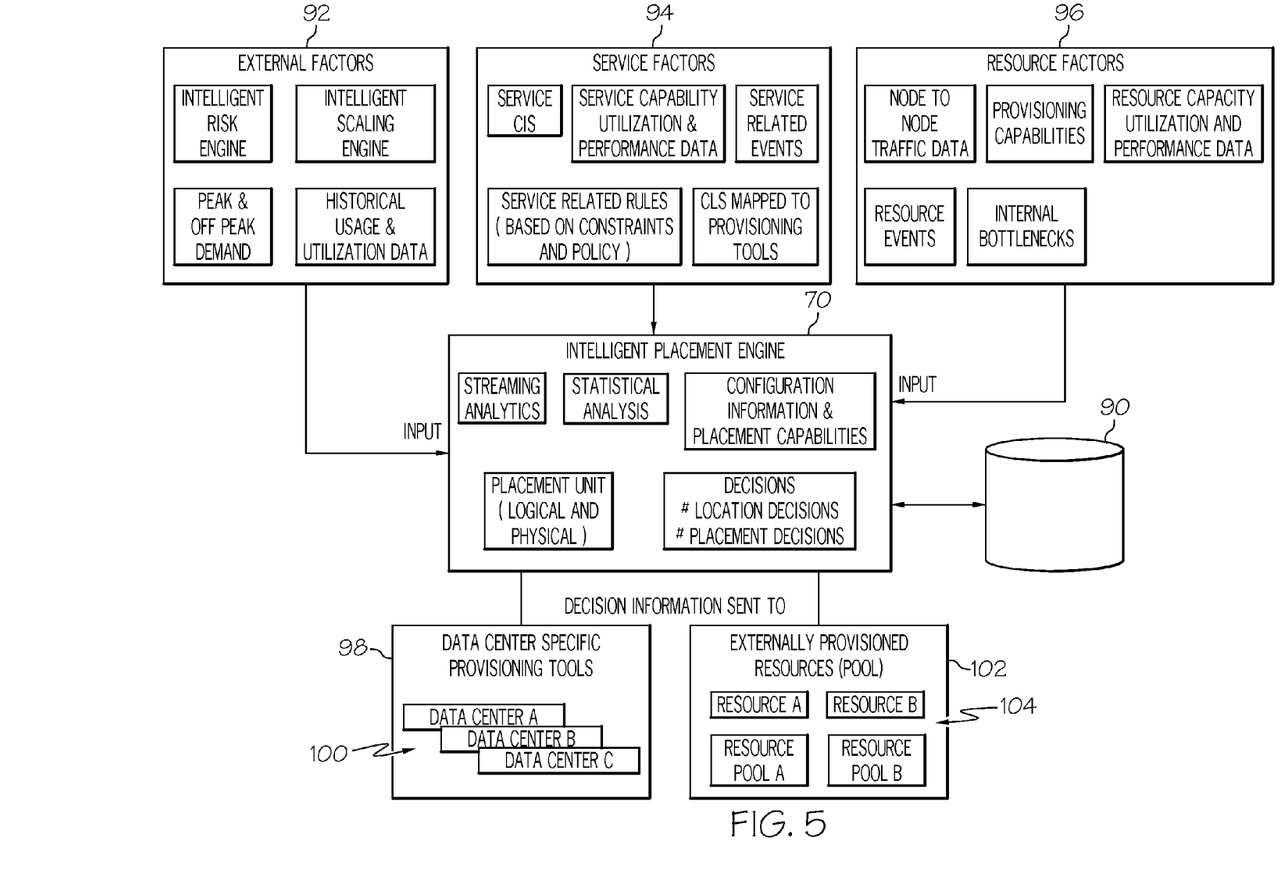
FIG. 5 depicts a component model according to an embodiment of the present invention.

Referring now to FIG. 5, a component model diagram according to an embodiment of the present invention is shown. As depicted, an intelligent provisioning engine (engine 70) (e.g., also represented by one or more modules 42 of program/utility 40 of FIG. 1) is provided. As indicated above, engine 70 will access various types of information to intelligently provision service resources 104 (shown in provisioned resource pool 102) that may be available among a set of systems 100 (e.g., separate and distinct data centers shown in provisioning tools 98). Thus, the embodiments described herein provide an approach for inter-system (e.g., inter-cloud) service resource provisioning.

As shown, engine 70 will access various types and/or sources of information. One such source is service intelligence repository 90 from which engine 70 can obtain configuration information pertaining to the set of service resources 104 (of pool 102) available on set of systems 100 (accessible via provisioning tools 98). As further shown, engine 70 will further receive input in the form of:

- client specific factors 92 (e.g., intelligent risk engine data, intelligent scaling engine data, demand data, historical usage data, and rules for service provisioning (not shown);
- service factors 94 (e.g., service continuous integration (CI), service capacity utilization and performance data; service related events; service resource related rules and/or policies, and/or mapping data (CIs are any hardware or software systems, sub-systems, components, documents, etc. that need to be managed in order to deliver an IT Service); and/or
- resource factors 96 (e.g., resource scaling capabilities, resource provisioning capabilities, resource capacity utilization and performance data (e.g., operational characteristics); resource events; and internal bottleneck data.

As indicated, multiple types of information/data received by engine 70 are a set of rules pertaining to any constraints on the set of service resources, a set of policies pertaining to provisioning the set of service resources, and real-time data (e.g., streaming analytics) pertaining to operational characteristics of the set of service resources. Under embodiments of the present invention, the set of rules can further pertain to at least one of the following: available resource pools, locations from where the set of service resources can be provisioned, a capability for the set of service resources to be automatically provisioned, or a granularity of the set of service resources. Moreover, the set of policies can further pertain to at least one of the following: co-location of the set of service resources, or a set of risk factors. Still yet, the real-time data can further pertain to at least one of the following: service traffic through the set of service resources, monitoring and management systems associated with the set of service resources, or load balancing systems associated with the set of service resources. Shown below are examples of policies and rules:

Example 1 for a policy: Allocation of resources should align resource tiers (and associated resource pool) to service tier (service level tier).

Example 2 for a policy: A bank customer's account information, particularly sensitive customer personal data such as social security number, address, contact information, name, family information, etc., should only be stored in the storage clouds located within the geographic region "A".

Example 1 for a rule: High end or premium storage pools (e.g., using higher cost, high performance, and/or highly resilient storage resources) should only be used for allocating storage resources to Tier "X" services (e.g., that have SLAs and penalties for breaching SLAs).

Example 2 for a rule: Provisioning of any database or file system (physical or virtual) which contains or may contain sensitive customer personal information including social security number should only be stored in enterprise storage private cloud A, B and C (e.g., all of which are located within geographic region "A").

Based on the information collected, engine 70 will perform an analysis (e.g., statistical) to develop/determine/generate a protocol to intelligently locate components hereunder. In developing the protocol, engine 70 will make various decisions/determinations (e.g., the number of units to provision, the timing and frequency thereof, location/placement, etc.). Moreover, engine 70 can integrate the protocol with at least one scaling engine and/or at least one resource provisioning tool for implementation. In general, the protocol can be generated so that the rules, policies, and any applicable service level agreement (SLA) terms are followed appropriately, while providing the most efficient and effective use of service resources. Along these lines, engine 70 can include a rules engine or the like that can apply rules, policies and real-time data. As such, one or more of the following items can result from the rules engine:

(A) a protocol (e.g., a document, an XML file, etc.) that can be reviewed, approved and implemented manually;

(B) a protocol that can be approved and implemented automatically (i.e., pre-approved—similar to pre-approved changes via interfacing with provisioning tools); and/or (C) a combination of manual and automated actions (e.g., manual review and approval with automated implementation).

Figure 6:
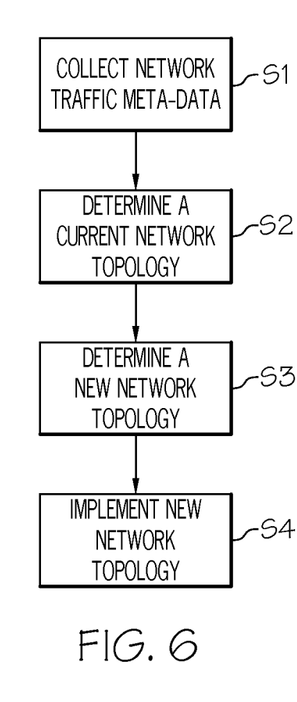
FIG. 6 depicts a method flow diagram according to an embodiment of the present invention.

Referring now to FIG. 6, a method flow diagram according to an embodiment of the present invention is shown. In step S1, network traffic meta-data for each of a set of components in the networked computing environment is collected. In step S2, a current network topology of the set of components is determined based on the network traffic meta-data. In step S3, the network traffic meta-data is analyzed to determine an optimized network topology for the set of components, the optimized network topology minimizing the number of hops the set of data makes as the set of data is communicated between the set of components. In step S4, the optimized network topology is implemented.

While shown and described herein as an intelligent component placement solution, it is understood that the invention further provides various alternative embodiments. For example, in one embodiment, the invention provides a computer-readable/useable medium that includes computer program code to enable a computer infrastructure to provide intelligent component placement functionality as discussed herein. To this extent, the computer-readable/useable medium includes program code that implements each of the various processes of the invention. It is understood that the terms computer-readable medium or computer-useable medium comprise one or more of any type of physical embodiment of the program code. In particular, the computer-readable/useable medium can comprise program code embodied on one or more portable storage articles of manufacture (e.g., a compact disc, a magnetic disk, a tape, etc.), on one or more data storage portions of a computing device, such as memory 28 (FIG. 1) and/or storage system 34 (FIG. 1) (e.g., a fixed disk, a read-only memory, a random access memory, a cache memory, etc.).

In another embodiment, the invention provides a method that performs the process of the invention on a subscription, advertising, and/or fee basis. That is, a service provider, such as a Solution Integrator, could offer to provide intelligent component placement functionality. In this case, the service provider can create, maintain, support, etc., a computer infrastructure, such as computer system 12 (FIG. 1) that performs the processes of the invention for one or more consumers. In return, the service provider can receive payment from the consumer(s) under a subscription and/or fee agreement and/or the service provider can receive payment from the sale of advertising content to one or more third parties.

In still another embodiment, the invention provides a computer-implemented method for intelligent component placement. In this case, a computer infrastructure, such as computer system 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system 12 (FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

As used herein, it is understood that the terms "program code" and "computer program code" are synonymous and mean any expression, in any language, code, or notation, of a set of instructions intended to cause a computing device having an information processing capability to perform a particular function either directly or after either or both of the following: (a) conversion to another language, code, or notation; and/or (b) reproduction in a different material form. To this extent, program code can be embodied as one or more of: an application/software program, component software/a library of functions, an operating system, a basic device system/driver for a particular computing device, and the like.

A data processing system suitable for storing and/or executing program code can be provided hereunder and can include at least one processor communicatively coupled, directly or indirectly, to memory elements through a system bus. The memory elements can include, but are not limited to, local memory employed during actual execution of the program code, bulk storage, and cache memories that provide temporary storage of at least some program code in order to reduce the number of times code must be retrieved from bulk storage during execution. Input/output and/or other external devices (including, but not limited to, keyboards, displays, pointing devices, etc.) can be coupled to the system either directly or through intervening device controllers.

Network adapters also may be coupled to the system to enable the data processing system to become coupled to other data processing systems, remote printers, storage devices, and/or the like, through any combination of intervening private or public networks. Illustrative network adapters include, but are not limited to, modems, cable modems, and Ethernet cards.

The foregoing description of various aspects of the invention has been presented for purposes of illustration and description. It is not intended to be exhaustive or to limit the invention to the precise form disclosed and, obviously, many modifications and variations are possible. Such modifications and variations that may be apparent to a person skilled in the art are intended to be included within the scope of the invention as defined by the accompanying claims.

What is claimed is:

1. A computer-implemented method for determining optimal component location in a networked computing environment, comprising:

collecting, in a computer storage device, network traffic meta-data for each of at least one network-attached storage (NAS) device and at least one cache device in the networked computing environment, the network traffic meta-data identifying a number of hops a set of data makes as the set of data is communicated between the at least one NAS device and the at least one cache device, the network traffic meta-data comprising at least one of the following: a propagation delay, a processing and serialization delay, a queuing delay, and a latency of communication as the set of data is communicated between the at least one NAS device and the at least one cache device under the existing network topology;

determining a current network topology of the at least one NAS device and the at least one cache device based on the network traffic meta-data;

analyzing the network traffic meta-data of a traffic pattern between the at least one NAS device and the at least one cache device;

determining an optimized network topology for the at least one NAS device relative to the at least one cache device based on the analysis of the network traffic meta-data, the optimized network topology minimizing the number of hops the set of data makes as the set of data is communicated between the at least one NAS device and the at least one cache device; and implementing the optimized network topology.

2. The computer-implemented method of claim 1, the implementing comprising relocating at least one of the least one NAS device and the at least one cache device to achieve the minimized number of hops.

3. The computer-implemented method of claim 1, the network traffic meta-data further comprising a magnitude of data traffic between the at least one NAS device and the at least one cache device.

4. The computer-implemented method of claim 1, the at least one NAS device and the at least one cache device comprising a set of physical network hardware.

5. The computer-implemented method of claim 1, the at least one NAS device and the at least one cache device further comprising a set of virtual devices.

6. The computer-implemented method of claim 1, the networked computing environment comprising a cloud computing environment.

7. A system for determining optimal component location in a networked computing environment, comprising:

a memory medium comprising instructions;

a bus coupled to the memory medium; and a processor coupled to the bus that when executing the instructions causes the system to:

collect, in a computer storage device, network traffic meta-data for each of at least one network-attached storage (NAS) device and at least one cache device in the networked computing environment, the network traffic meta-data identifying a number of hops a set of data makes as the set of data is communicated between the at least one NAS device and the at least one cache device, the network traffic meta-data comprising at least one of the following: a propagation delay, a processing and serialization delay, a queuing delay, and a latency of communication as the set of data is communicated between the at least one NAS device and the at least one cache device under the existing network topology;

determine a current network topology of the at least one NAS device and the at least one cache device based on the network traffic meta-data;

analyze the network traffic meta-data of a traffic pattern between the at least one NAS device and the at least one cache device;

determine an optimized network topology for the at least one NAS device and the at least one cache device based on the analysis of the network traffic meta-data, the optimized network topology minimizing the number of hops the set of data makes as the set of data is communicated between the set of components; and implement the optimized network topology.

8. The system of claim 7, the memory medium further comprising instructions for causing the system to relocate at least one of the at least one NAS device and the at least one cache device to achieve the minimized number of hops.

9. The system of claim 7, the network traffic meta-data further comprising a magnitude of data traffic between the at least one NAS device and the at least one cache device.

10. The system of claim 7, the at least one NAS device and the at least one cache device comprising a set of physical network hardware.

11. The system of claim 8, the at least one NAS device and the at least one cache device further comprising a set of virtual devices.

12. The system of claim 7, the networked computing environment comprising a cloud computing environment.

13. A computer program product for determining optimal component location in a networked computing environment, the computer program product comprising a computer readable storage device, and program instructions stored on the computer readable storage device, to:

collect, in a computer storage device, network traffic meta-data for each of at least one network-attached storage (NAS) device and at least one cache device in the networked computing environment, the network traffic meta-data identifying a number of hops a set of data makes as the set of data is communicated between the at least one NAS device and the at least one cache device, the network traffic meta-data comprising at least one of the following: a propagation delay, a processing and serialization delay, a queuing delay, and a latency of communication as the set of data is communicated between the at least one NAS device and the at least one cache device under the existing network topology;

determine a current network topology of the at least one NAS device and the at least one cache device based on the network traffic meta-data;

analyze the network traffic meta-data of a traffic pattern between the at least one NAS device and the at least one cache device;

determine an optimized network topology for the at least one NAS device and the at least one cache device based on the analysis of the network traffic meta-data, the optimized network topology minimizing the number of hops the set of data makes as the set of data is communicated between the at least one NAS device and the at least one cache device; and implement the optimized network topology.

14. The computer program product of claim 13, the computer readable storage device further comprising instructions to relocate at least one of the at least one NAS device and the at least one cache device to achieve the minimized number of hops.

15. The computer program product of claim 13, the network traffic meta-data further comprising a magnitude of data traffic between the at least one NAS device and the at least one cache device.

16. The computer program product of claim 13, the at least one NAS device and the at least one cache device comprising a set of physical network hardware.

17. The computer program product of claim 13, the at least one NAS device and the at least one cache device further comprising a set of virtual devices.

18. The computer program product of claim 13, the networked computing environment comprising a cloud computing environment.

19. A method for deploying a system for determining optimal component location in a networked computing environment, comprising:

providing a computer infrastructure being operable to:
collect, in a computer storage device, network traffic meta-data for each of at least one network-attached storage (NAS) device and at least one cache device in the networked computing environment, the network traffic meta-data identifying a number of hops a set of data makes as the set of data is communicated between the at least one NAS device and the at least one cache device, the network traffic meta-data comprising at least one of the following: a propagation delay, a processing and serialization delay, a queuing delay, and a latency of communication as the set of data is communicated between the at least one NAS device and the at least one cache device under the existing network topology;

determine a current network topology of the at least one NAS device and the at least one cache device based on the network traffic meta-data;

analyze the network traffic meta-data of a traffic pattern between the at least one NAS device and the at least one cache device;

determine an optimized network topology for the at least one NAS device and the at least one cache device based on the network traffic meta-data, the optimized network topology minimizing the number of hops the set of data makes as the set of data is communicated between the at least one NAS device and the at least one cache device; and implement the optimized network topology.

* * * * *